No. 622,829. Patented Apr. 11, 1899.
N. P. STEVENS.
SPARK ARRESTER.
(Application filed Dec. 1, 1898.)
(No Model.)
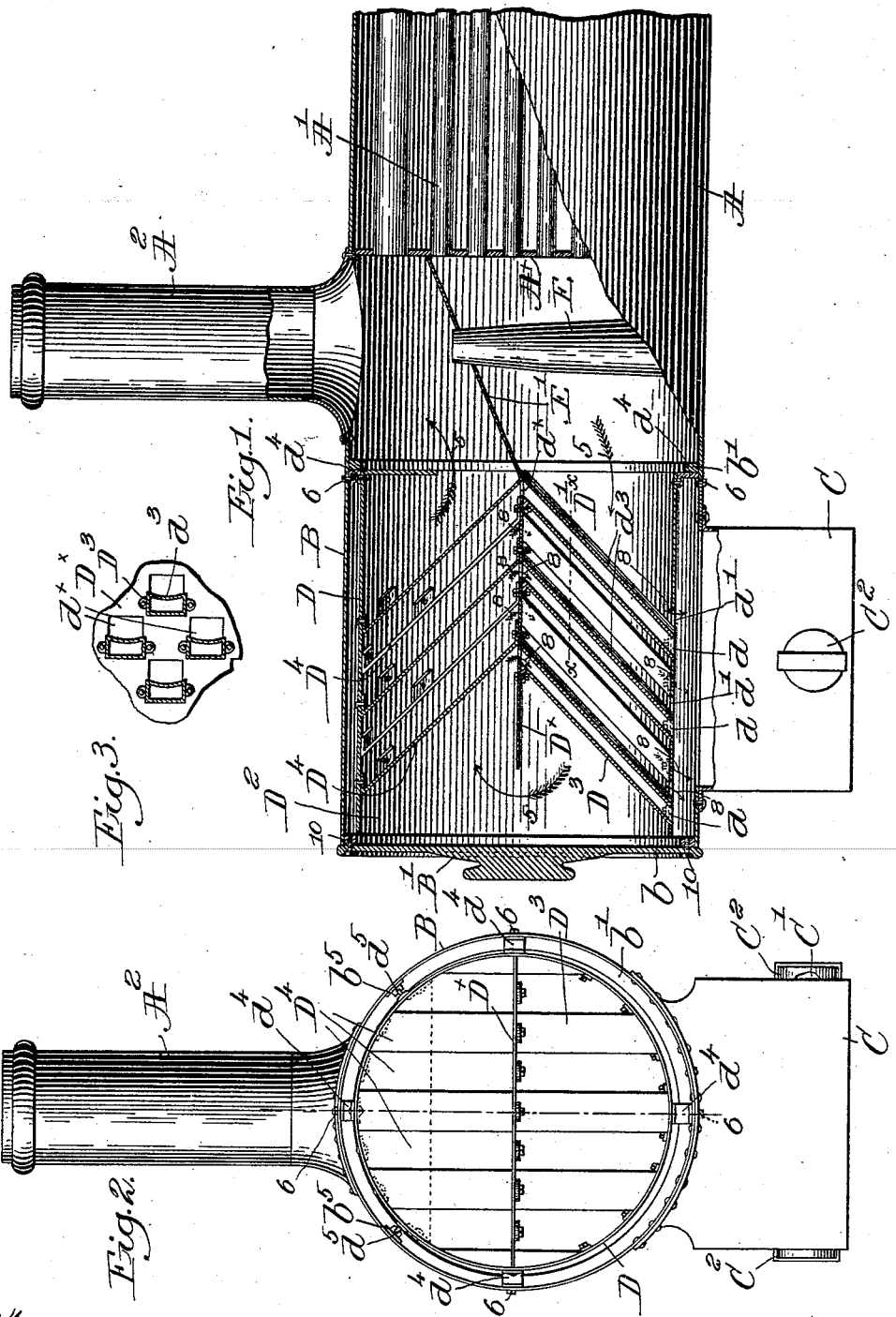
Witnesses:
Fred S. Greenleaf
Thomas J. Drummond
Inventor:
Nathan P. Stevens,
By Crosby & Gregory, attys.
THE NORRIS PETERS CO., PHOTO-LITHO., WASHINGTON, D. C.

UNITED STATES PATENT OFFICE.

NATHAN P. STEVENS, OF CONCORD, NEW HAMPSHIRE.

SPARK-ARRESTER.

SPECIFICATION forming part of Letters Patent No. 622,829, dated April 11, 1899.

Application filed December 1, 1898. Serial No. 697,950. (No model.)

*To all whom it may concern:*

Be it known that I, NATHAN P. STEVENS, of Concord, county of Merrimac, State of New Hampshire, have invented an Improvement in Spark-Arresters, of which the following description, in connection with the accompanying drawings, is a specification, like letters and figures on the drawings representing like parts.

This invention has for its object the production of a novel and effective spark-arrester for boilers, particularly adapted for use with locomotive-boilers, whereby the sparks and cinders are prevented from passing out with the exhaust, thus obviating a nuisance and in dry weather a source of great danger to adjacent property.

I have herein illustrated my invention in connection with a locomotive-boiler, as the widest field for its use is in connection with such apparatus, although it will be obvious hereinafter that my invention is not restricted to such use.

Figure 1, in vertical longitudinal section, represents the forward end of a locomotive-boiler, the smoke-box, and exhaust-outlet with one embodiment of my invention in operative position in the smoke-box. Fig. 2 is a front elevation of the apparatus, the head of the smoke-box being omitted; and Fig. 3 is a horizontal sectional detail of the tubular baffles, to be described, on the line $xx$, Fig. 1, looking upward.

The boiler-shell A, fire-tubes A', smoke-stack $A^2$, smoke-box B, projecting beyond the end of the boiler, and the upturned exhaust pipe or outlet E, Fig. 1, may be and are of usual construction in locomotive-engines.

An inclined deflector-plate E' extends from the tube-sheet $A^\times$ forward to the inner end of the spark-arrester, to be described, the exhaust-outlet E passing up through the plate, so that the products of combustion are deflected toward the lower part of the boiler.

The spark-arrester is preferably removably supported in the smoke-box B and consists of a tubular shell D, as herein shown, divided by a transverse partition or diaphragm $D^\times$ into a lower receiving-chamber D' and an upper discharge-chamber $D^2$, the inner end of said diaphragm meeting the lower edge $e$ of the deflector-plate E', as clearly shown in Fig. 1, so that said chambers are separated at their inner ends, but communicate at the outer end of the shell, the diaphragm extending only part way the length of the shell. Thus the inner end of the chamber D' is open and forms an inlet for the products of combustion, passing from the boiler-flues below the deflector E', while the open inner end of the chamber $D^2$ forms an outlet above the deflector, the direction of current being indicated by the arrows 5.

The diaphragm $D^\times$ has a series of staggered openings $d^\times$, located at the outer or inlet sides and adjacent the lower ends of a series of preferably narrow baffle-plates $D^4$, suitably bolted to the diaphragm and to the shell D to form a tortuous passage through the discharge-chamber $D^2$, said baffle-plates being preferably inclined upward and outward.

In the receiving-chamber D' are located a series of staggered baffle-tubes $D^3$, attached at their upper ends to the diaphragm $D^\times$ to register with the cinder-outlets $d^\times$ therein and communicating at their lower ends with openings $d$ in the shell D, thus forming closed ducts from the chamber $D^2$ to the exterior of the shell, said baffle-tubes being preferably inclined oppositely to the baffle-plates $D^4$.

I prefer to form the rear walls $d^3$ of the baffle-tubes, as shown best in Fig. 3, curved transversely and concaved to the incoming products of combustion to thereby better direct sparks and cinders down to cinder-outlets $d'$ in the bottom of the chamber D', said outlets being located adjacent the lower ends and at the inlet sides of the baffle-tubes.

A cinder-box C is shown as attached to the under side of the smoke-box below the openings $d$ $d'$ of the shell D to receive the sparks and cinders, said cinder-box having suitable blow-out openings C' in its sides normally closed by caps $C^2$, Fig. 2.

The outer end of the smoke-box is shown as provided with an internal ring $b$, to which the head or closure B' is suitably secured, as by screws 10, the head closing the smoke-box and outer end of the shell D.

From the foregoing it will be seen that the products of combustion pass from the flues into the chamber D', traveling around the baffle-tubes $D^3$ therein, and some of the sparks and cinders will pass out through the outlets $d'$ into the receptacle C. The draft created by the exhaust will draw the smoke and other sparks and cinders up around the outer end of the diaphragm $D^\times$ into the chamber $D^2$, where they are met by the baffle-plates $D^4$, which direct the remaining cinders through the outlets $d^\times$ into the tubular baffles $D^3$, whence they are discharged at the openings $d$ into the box C, the smoke passing finally from the inner open end of chamber $D^2$ to the stack practically free from sparks or cinders.

The spark-arrester may be supported in any suitable manner in the smoke-box, and herein I have shown the shell D as provided with two external longitudinal ribs $d^5$ on its upper side to enter suitable guides $b^5$, secured to the smoke-box. (See Fig. 2.) A ring $b'$ at the inner end of the smoke-box serves as an abutment for ears $d^4$, secured to the shell D, said ears being detachably connected with the smoke-box by suitable screw-bolts 6, so that by removing the head $B'$ and the bolts 6 the spark-arrester can be withdrawn bodily to be cleaned or repaired, the ribs $d^5$ serving to position and partly support the shell D when in place.

I prefer to mount the shell D eccentric with the smoke-box in order to leave a greater space between them at the bottom than at the top to provide for the collection of cinders in the lower part of the smoke-box.

The short arrows 8 in Fig. 1 indicate the direction of the cinders or sparks as they are discharged.

My invention is not restricted to the precise construction and arrangement shown and described, for the same may be modified or rearranged without departing from the spirit and scope of my invention.

Having described my invention, what I claim as new, and desire to secure by Letters Patent, is—

1. A spark-arrester having receiving and discharge chambers for the products of combustion communicating at a point remote from the inlet of the former, a series of staggered tubular baffles in the receiving-chamber, to form a tortuous passage therethrough, and communicating with the discharge-chamber, staggered baffle-plates in the latter chamber, and cinder-outlets in each chamber adjacent the lower ends and at the inlet sides of the baffles, substantially as described.

2. A spark-arrester having receiving and discharge chambers for the products of combustion, communicating at a point remote from the inlet of the former, a series of staggered, tubular baffles in the receiving-chamber, communicating at their upper ends with the discharge-chamber, staggered baffle-plates in the latter chamber, their lower ends being interposed between the inlets of the tubular baffles and the main outlet of said chamber, and cinder-outlets in the receiving-chamber, at the inlet sides of and adjacent the lower ends of said tubular baffles.

3. A spark-arrester comprising a tubular shell having a closure at its outer end, a transverse diaphragm dividing it into a lower receiving and an upper discharge chamber for the products of combustion, said chamber communicating at the closed end of the shell, staggered baffles in the discharge-chamber, cinder-outlets in the diaphragm at the inlet side of and adjacent the lower ends of said baffles, staggered baffle-tubes leading from said outlets through the receiving-chamber to the exterior of the shell at its lower portion, and cinder-outlets in the said chamber at the inlet sides of and adjacent the lower ends of the baffle-tubes.

4. A spark-arrester comprising a tubular shell having external, longitudinal supporting and positioning ribs, superposed discharge and receiving chambers within it, the latter having an inlet and the former an outlet for the products of combustion from a boiler, baffles in each chamber, and cinder-outlets for said chambers, located adjacent the lower ends and at the inlet sides of the respective series of baffles, the chambers communicating at the outer, closed end of the shell beyond the baffles.

5. A locomotive-boiler having a projecting smoke-box beyond the exhaust-outlet, and an inclined directing-plate to deflect the products of combustion to the lower part of the box, combined with a removable spark-arrester in the smoke-box, said arrester comprising a tubular shell closed at its outer end and having a lower receiving and an upper discharge chamber for the products of combustion, communicating at the closed end of the shell, staggered baffle-plates in the discharge-chamber, cinder-outlets adjacent the lower ends and at the inlet side of said plates, staggered baffle-tubes leading from said outlets through the receiving-chamber to the exterior of the shell at its lower portion, and cinder-outlets in the said chamber at the inlet sides of and adjacent the lower ends of the baffle-tubes, the directing-plate separating the main inlet and outlet openings of the receiving and discharge chambers.

In testimony whereof I have signed my name to this specification in the presence of two subscribing witnesses.

NATHAN P. STEVENS.

Witnesses:
JOHN C. EDWARDS,
AUGUSTA E. DEAN.